United States Patent
Motoki et al.

(10) Patent No.: US 7,589,952 B2
(45) Date of Patent: Sep. 15, 2009

(54) MULTILAYER ELECTRONIC DEVICE AND METHOD FOR MANUFACTURING THE SAME

(75) Inventors: Akihiro Motoki, Fukui (JP); Kenichi Kawasaki, Echizen (JP); Makoto Ogawa, Fukui (JP); Shigeyuki Kuroda, Sabae (JP); Tatsuo Kunishi, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/109,371

(22) Filed: Apr. 25, 2008

(65) Prior Publication Data
US 2008/0225462 A1    Sep. 18, 2008

Related U.S. Application Data
(63) Continuation of application No. PCT/JP2007/068624, filed on Sep. 26, 2007.

(30) Foreign Application Priority Data
Nov. 22, 2006    (JP)    ............... 2006-315074

(51) Int. Cl.
*H01G 4/228*    (2006.01)
(52) U.S. Cl. .................... 361/306.3; 29/25.42
(58) Field of Classification Search ............. 361/306.1, 361/306.3, 309, 311; 29/25.42
See application file for complete search history.

(56) References Cited

U.S. PATENT DOCUMENTS

| | | | |
|---|---|---|---|
| 5,852,768 A * | 12/1998 | Jacobsen et al. | ............ 419/63 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 2005/0046536 A1 | 3/2005 | Ritter et al. | |
| 2007/0014075 A1 | 1/2007 | Ritter et al. | |

(Continued)

FOREIGN PATENT DOCUMENTS

JP    02-178910 A    7/1990

(Continued)

OTHER PUBLICATIONS

Kunishi et al.; "Method of Manufacturing Multilayer Electronic Component"; U.S. Appl. No. 12/041,889, filed Mar. 4, 2008.

(Continued)

Primary Examiner—Eric Thomas
(74) Attorney, Agent, or Firm—Keating & Bennett, LLP

(57) ABSTRACT

A multilayer electronic device includes a laminate and an external electrode that is formed on an end surface of the laminate after a plurality of conductive particles having a particle diameter of about 1 μm or more is adhered to the end surface of the laminate, for example, by a sandblast method or a brush polishing method. The external electrode is defined by a plating film that is formed by electroplating or electroless plating.

5 Claims, 4 Drawing Sheets

U.S. PATENT DOCUMENTS

2007/0133147 A1    6/2007    Ritter et al.

FOREIGN PATENT DOCUMENTS

JP            03029307 A  *  2/1991
JP            05-343259 A     12/1993

OTHER PUBLICATIONS

Motoki et al.; "Multilayer Electronic Component and Method for Manufacturing Multilayer Electronic Component"; U.S. Appl. No. 12/055,372, filed Mar. 26, 2008.

Motoki et al.; "Multilayer Electronic Component and Method for Manufacturing the Same"; U.S. Appl. No. 12/110,484, filed Apr. 28, 2008.

Kunishi et al.; "Laminated Electronic Component and Method for Manufacturing the Same"; U.S. Appl. No. 12/030,360, filed Feb. 13, 2008.

Kunishi et al.; "Laminated Electronic Component and Method for Manufacturing the Same"; U.S. Appl. No. 12/030,282, filed Feb. 13, 2008.

Official communication issued in the International Application No. PCT/JP2007/068624, mailed on Jan. 8, 2008.

\* cited by examiner

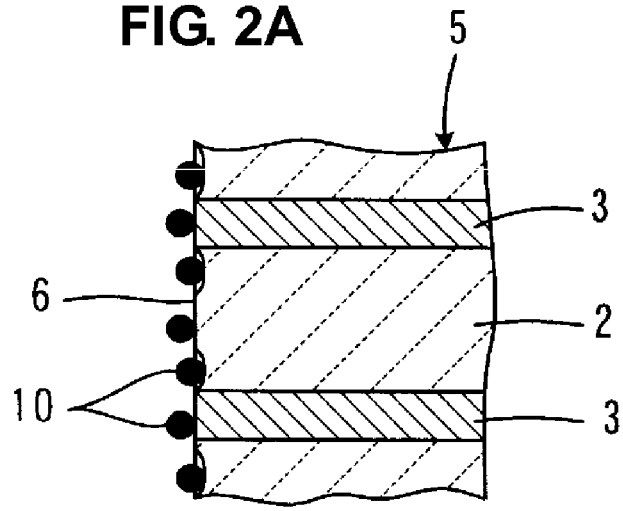
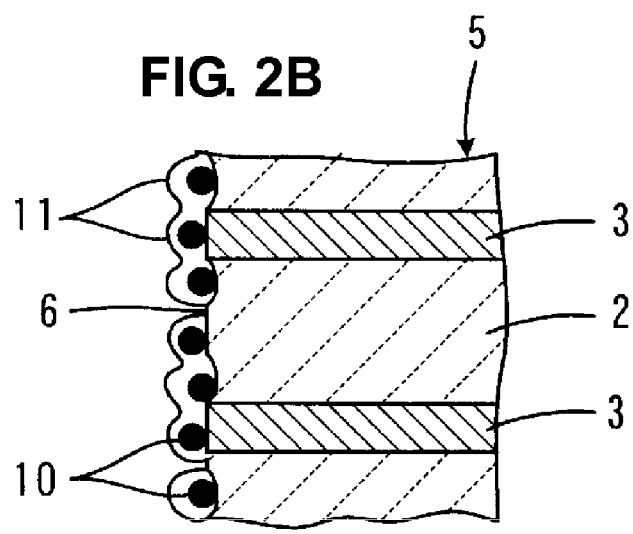
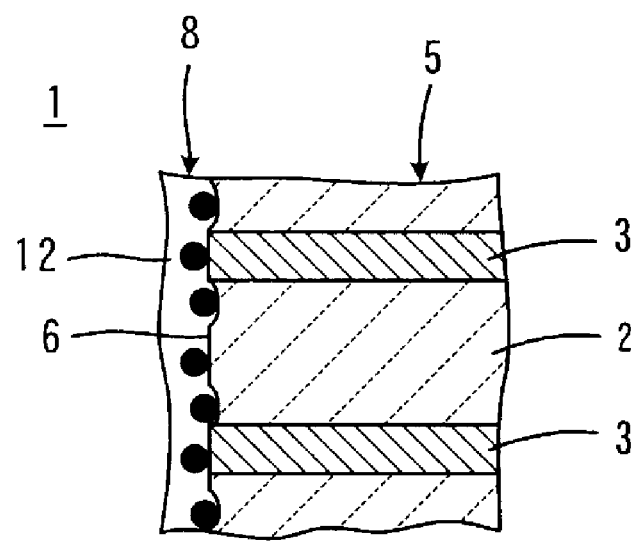

MULTILAYER ELECTRONIC DEVICE AND METHOD FOR MANUFACTURING THE SAME

BACKGROUND OF THE INVENTION

1. Field of the Invention

The present invention relates to a multilayer electronic device and a method for manufacturing the same, and more particularly to a multilayer electronic device formed by plating external electrodes directly on external surfaces of a laminate and to a method for manufacturing the multilayer electronic device.

2. Description of the Related Art

As shown in FIG. 6, a multilayer electronic device 101, which is represented by a multilayer ceramic capacitor, includes a laminate 105 including a plurality of insulating layers 102 laminated to each other and a plurality of layer-shaped internal electrodes 103 and 104 provided along interfaces between the insulating layers 102. At one end surface 106 and the other end surface 107 of the laminate 105, edges of the internal electrodes 103 and edges of the internal electrodes 104 are exposed, respectively, and external electrodes 108 and 109 are arranged to electrically connect the edges of the internal electrodes 103 and the edges of the internal electrodes 104, respectively.

When the external electrodes 108 and 109 are formed, in general, paste electrode films 110 are first formed by applying a metal paste including a metal component and a glass component on the end surfaces 106 and 107 of the laminate 105, followed by firing. Next, on the paste electrode films 110, first plating layers 111 including Ni or other suitable material as a primary component are formed, and furthermore, on the first plating films, second plating films 112 including Sn or other suitable material as a primary component are formed. That is, each of the external electrodes 108 and 109 have a three-layer structure including the paste electrode film 110, the first plating film 111, and the second plating film 112.

The external electrodes 108 and 109 must have superior wettability to solder when the multilayer electronic device 101 is mounted on a substrate using solder. At the same time, the external electrode 108 electrically connects the internal electrodes 103 which are in an electrically insulated state, and the external electrode 109 electrically connects the internal electrodes 104 which are in an electrically insulated state. The second plating film 112 ensures the solder wettability, and the paste electrode films 110 electrically connect the respective internal electrodes 103 and 104. The first plating film 111 prevents solder leaching during solder bonding.

However, the paste electrode film 110 has a relatively large thickness, such as several tens to several hundreds of micrometers. Thus, when the dimensions of this multilayer electronic device 101 are set within a predetermined standard value, an effective volume to ensure an electrostatic capacity is decreased by an amount corresponding to the volume of the paste electrodes 110. On the other hand, since the thickness of each of the plating films 111 and 112 is approximately several micrometers, if each of the external electrodes 108 and 109 can be formed only by the first plating film 111 and the second plating film 112, a larger effective volume for the electrostatic capacity can be provided.

As described above, when the external electrodes are directly formed on the end surfaces of the laminate by plating, it is necessary not only to deposit plating deposits on edges of the internal electrodes exposed at the end surfaces of the laminate but also to grow the plating deposits so as to be mutually cross-linked to each other. However, as the distance between the edges of adjacent internal electrodes is increased, even if plating growth occurs, the cross-linking is not likely to occur. In this case, connection failures between the internal electrodes and the plating films and degradation in the insulating resistance due to intrusion of moisture and other contaminants may disadvantageously occur.

In addition, it is virtually impossible to form the external electrode on not only the end surface of the laminate but also to extend on portions of side surfaces adjacent to the end surface. The reason for this is that the edges of the internal electrodes are not exposed at the side surfaces of the laminate.

A technique for solving the above-described problem, for example, is disclosed in Japanese Unexamined Patent Application Publication No. 2004-40084. Japanese Unexamined Patent Application Publication No. 2004-40084 discloses that in a region in which an external electrode is to be formed, edges of dummy electrodes are exposed at locations at which edges of internal electrodes are not exposed. With this technique, even in a region in which exposed edges of the internal electrode are not provided or a region in which the distribution density thereof is low, plating deposits are likely to be cross-linked to each other, and thus, by plating, a reliable external electrode can be formed. In addition, when the technique disclosed in Japanese Unexamined Patent Application Publication No. 2004-40084 is used, even on the side surfaces at which the edges of the internal electrodes are not exposed, the external electrode can be formed by plating.

However, when the technique disclosed in Japanese Unexamined Patent Application Publication No. 2004-40084 is performed, since internal electrodes defining the dummy electrodes are required, in addition to the actual internal electrodes, the total number of the internal electrodes to be formed is increased. Thus, a step of forming the internal electrodes is complicated, and as a result, the manufacturing cost is increased. In addition, when the locations at which the dummy electrodes are to be formed, or when the dummy electrodes are displaced when being laminated to each other to form a laminate, the dummy electrodes may not be appropriately exposed at predetermined locations. When the dummy electrodes are not sufficiently exposed, a plating film may not be uniformly formed. When the plating film is not uniformly formed, connection failures with the actual internal electrodes may occur, and as a result, the reliability of a multilayer electronic device may be decreased.

SUMMARY OF THE INVENTION

To overcome the problems described above, preferred embodiments of the present invention provide a method for manufacturing a multilayer electronic device, and a multilayer electronic device manufactured thereby.

A method for manufacturing a multilayer electronic device according to a preferred embodiment of the present invention includes the steps of preparing a laminate including a plurality of insulating layers laminated to each other and a plurality of internal electrodes formed along interfaces between the insulating layers, edges of the internal electrodes being exposed at a predetermined surface of the laminate, and forming an external electrode on the predetermined surface of the laminate so as to electrically connect the individual edges of the internal electrodes, which are exposed at the predetermined surface of the laminate.

The step of forming an external electrode preferably includes the steps of adhering conductive particles having a particle diameter of about 1 μm or more to the predetermined surface of the laminate which is prepared in the step of preparing a laminate, and performing plating directly on the predetermined surface to which the conductive particles are adhered.

In the above step of adhering conductive particles, for example, a sandblast method is preferably performed on the predetermined surface using conductive particles mixed with polishing particles having a polishing effect. Alternatively, a brush polishing method is preferably performed on the predetermined surface using a brush having resin-made bristles which contain the conductive particles.

The method for manufacturing a multilayer electronic device, according to this preferred embodiment of the present invention, preferably further includes the steps of, before the step of performing plating, adhering glass particles to the predetermined surface of the laminate, and after the step of performing plating, performing a heat treatment so as to diffuse glass forming the glass particles.

A multilayer electronic device obtained by the manufacturing method according to this preferred embodiment of the present invention includes the structural features described below.

That is, a multilayer electronic device according to another preferred embodiment of the present invention includes a laminate including a plurality of insulating layers laminated to each other and a plurality of internal electrodes provided along interfaces between the insulating layers, edges of the internal electrodes being exposed at a predetermined surface of the laminate, and an external electrode provided on the predetermined surface of the laminate. The external electrode includes a plating film which is directly provided on the predetermined surface of the laminate so as to electrically connect the individual edges of the internal electrodes, which are exposed at the predetermined surface of the laminate. In addition, at a boundary portion between the predetermined surface and the plating film, a plurality of conductive particles having a particle diameter of about 1 μm or more is distributed.

According to preferred embodiments of the present invention, when plating deposits adjacent to each other are grown and cross-linked to each other, the conductive particles function as a bridge therebetween. Thus, the plating deposits are likely to be cross-linked to each other, and a plating growth force necessary for cross-linking is reduced. Accordingly, even when the distance between the edges of the adjacent internal electrodes is relatively large, a plating film can be reliably formed on the predetermined surface of the laminate.

In addition, according to preferred embodiments of the present invention, even in a region in which the edges of the internal electrodes are not exposed, a plating film can be reliably formed by adhering the conductive particles to that region. Thus, for example, even when the edges of the internal electrodes are exposed only at the end surface of the laminate, a plating film can be formed on side surfaces adjacent to the end surface.

In addition, since the particle diameter of the conductive particles is increased to about 1 μm or more, a cross-linking phenomenon of the plating deposits can be reliably promoted.

Furthermore, since the dummy electrodes as disclosed in the Japanese Unexamined Patent Application Publication No. 2004-40084 are not necessary, the cost for forming the dummy electrodes is omitted, and the probability of failures caused by displacement of the dummy electrodes is greatly reduced.

In preferred embodiments of the present invention, in order to adhere the conductive particles, when a sandblast method is performed which uses the conductive particles mixed with polishing particles, in the step of adhering the conductive particles, a step of sufficiently exposing the edges of the internal electrodes at the predetermined surface can be simultaneously performed. In addition, when the conductive particles are made of a metal, since the conductive particles are adhered to the predetermined surface of the laminate so as to be pushed into the predetermined surface of the laminate, even if cleaning is performed by a polishing powder, the conductive particles are not easily removed.

In order to adhere the conductive particles, when a brush polishing method is performed with a brush having resin-made bristles which include the conductive particles, the same advantages as those obtained by the above-described sandblast method can also be obtained. In addition, with the brush polishing method, the bonding strength of the plating film which is to be subsequently formed is improved as compared to that obtained by the sandblast method.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIGS. 2A to 2C include cross-sectional views showing a partially enlarged laminate 5 shown in FIG. 1, the views sequentially showing steps of forming an external electrode 8.

DETAILED DESCRIPTION OF THE PREFERRED EMBODIMENTS

Figure 1:
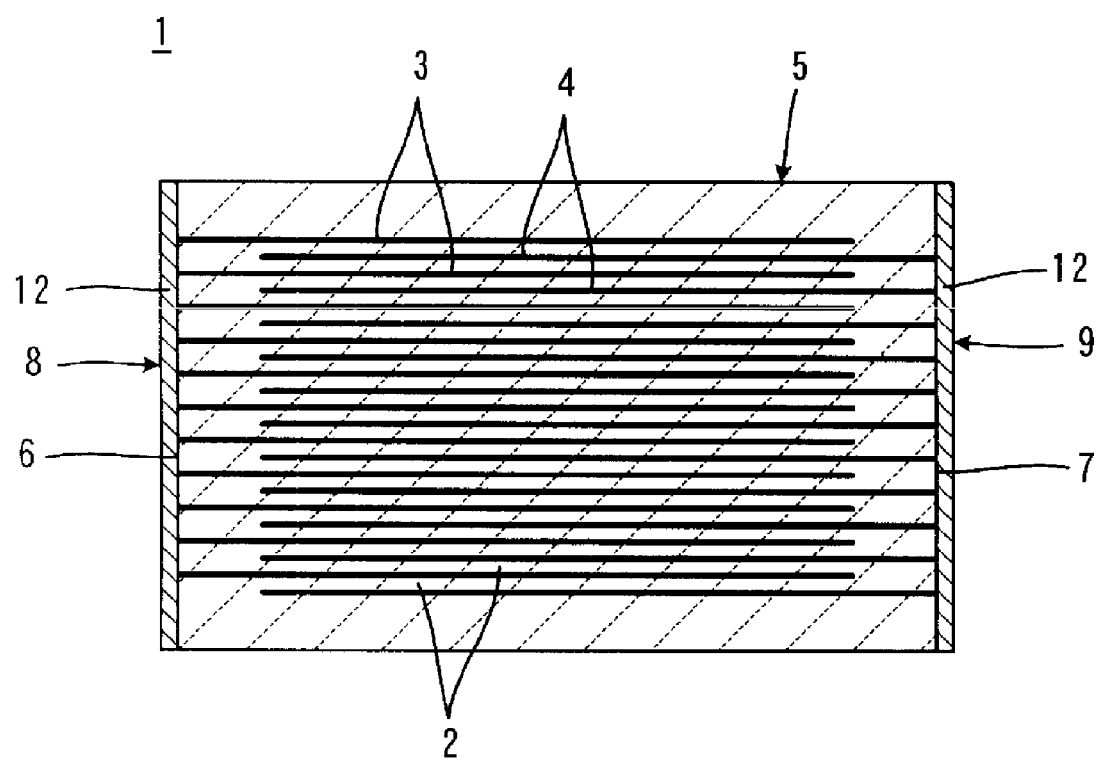
FIG. 1 is a cross-sectional view showing a multilayer electronic device 1 according to a first preferred embodiment of the present invention.

With reference to FIGS. 1 and 2, a multilayer electronic device 1 according to a first preferred embodiment of the present invention and a method for manufacturing the same will be described.

First, as shown in FIG. 1, the multilayer electronic device 1 includes a laminate 5 which includes a plurality of insulating layers 2 laminated to each other and layer-shaped internal electrodes 3 and 4 provided along interfaces between the insulating layers 2. When the multilayer electronic device 1 defines a multilayer ceramic capacitor, the insulating layers 2 are made of a dielectric ceramic. At one end surface 6 and the other end surface 7 of the laminate 5, edges of a plurality of internal electrodes 3 and edges of a plurality of internal electrodes 4 are exposed, respectively, and external electrodes 8 and 9 are arranged so as to electrically connect the edges of the internal electrodes 3 and the edges of the internal electrodes 4, respectively.

Each of the external electrodes 8 and 9 preferably are defined by a plating film 12 of plating deposits formed by wet plating, such as electroplating or electroless plating. That is, the external electrodes 8 and 9 do not include a conductive paste film, a vacuum deposition film, a sputtering film, or other films. The plating film 12 includes, for example, Cu as a primary component.

Next, a method for manufacturing the multilayer electronic device 1 according to a preferred embodiment of the present invention will be described with reference to FIGS. 2A to 2C. Primarily, a method for forming the external electrodes 8 and 9 will be described. FIGS. 2A to 2D show a portion of the laminate 5 shown in FIG. 1 and are enlarged views in the vicinity of the one end surface 6 at which the internal electrodes 3 are exposed. In addition, the other end surface 7 and the internal electrodes 4 exposed at the other end surface 7 are substantially the same as those of the above end surface 6 and internal electrodes 3.

First, the laminate 5 is prepared which includes the insulating layers 2 laminated to each other and the internal electrodes 3 and 4 formed along the interfaces between the insulating layers 2, and the edges of the internal electrodes 3 and 4 are exposed at the end surfaces 6 and 7, respectively.

Next, a step of forming the external electrodes 8 and 9 on the end surfaces 6 and 7 of the laminate 5, respectively, is performed so as to electrically connect the edges of the internal electrodes 3 and 4 exposed at the end surfaces 6 and 7 of the laminate 5.

In the step of forming the external electrodes 8 and 9, first, as shown in FIG. 2A, a step of adhering conductive particles 10 having a particle diameter of about 1 μm or more to the end surfaces 6 and 7 of the laminate 5 is performed. For conductive particles 10, for example, metal particles, such as silver particles, tin particles, or gold particles, are preferably used.

When the conductive particles 10 are adhered, for example, a sandblast method may be used. That is, a sandblast method is performed on the end surfaces 6 and 7 of the laminate 5 using the conductive particles 10 mixed with polishing particles having a polishing effect. With this sandblast method, even when the edges of the internal electrodes 3 and 4 are withdrawn from the end surfaces 6 and 7 of the prepared laminate and are not sufficiently exposed, the insulating layers 2 are ground, and the internal electrodes 3 and 4 can be sufficiently exposed at the end surfaces 6 and 7. In addition, when metal particles are used as the conductive particles 10, since the conductive particles 10 are pushed into the end surfaces 6 and 7, the conductive particles 10 are prevented from being easily removed during cleaning to remove the polishing particles.

In order to adhere the conductive particles 10, instead of the above sandblast method, a brush polishing method may also be used. That is, a brush polishing method is performed on the end surfaces 6 and 7 of the laminate 5 using a brush having resin-made bristles which include the conductive particles 10. Also by this brush polishing method, as in the case of the above-described sandblast method, the insulating layers 2 are ground, and the internal electrodes 3 and 4 can be sufficiently exposed at the end surfaces 6 and 7. In addition, the conductive particles 10 made of a metal can be pushed into the end surfaces 6 and 7. Furthermore, according to the brush polishing method, as described later, the bonding strength of the plating film can be improved.

Next, a step of performing plating directly on the end surfaces 6 and 7 to which the conductive particles 10 are adhered is performed. In the plating step, first, as shown in FIG. 2B, plating deposits 11 are deposited so as to cover exposed portions of the internal electrodes 3 and 4 and the conductive particles 10, and when the plating treatment is further continued, the plating deposits 11 are grown so that adjacent plating deposits 11 are cross-linked to each other. Thus, as shown in FIG. 2C, the adjacent plating deposits 11 are united together, so that a continuous film 12 is formed. The conductive particles 10 function to further promote cross-linking between the adjacent plating deposits 11.

As described above, as shown in FIG. 1, the multilayer electronic device 1 having the external electrodes 8 and 9 each defined by a plating film 12 is obtained. In this multilayer electronic device 1, at the boundary portions between the plating films 12 and the respective end surfaces 6 and 7, as shown in FIG. 2C, a plurality of the conductive particles 10 having a particle diameter of about 1 μm or more is distributed.

In addition, in the sandblast method or the brush polishing method by which the conductive particles 10 are adhered, before the step of performing plating, when glass particles are adhered to the end surfaces 6 and 7 of the laminate 5, for example, by mixing the glass particles with the conductive particles, and after the step of performing plating, when a heat treatment is performed so as to diffuse glass forming the glass particles, the bonding strength of the plating film 12 is further improved.

In the multilayer electronic device 1 as described above, each of the external electrodes 8 and 9 include a single-layer plating film 12. However, at least one layer may be provided as a plating film. One example of a multilayer electronic device in which each of the external electrodes include a plurality of plating films will be described with reference to FIG. 3.

Figure 3:
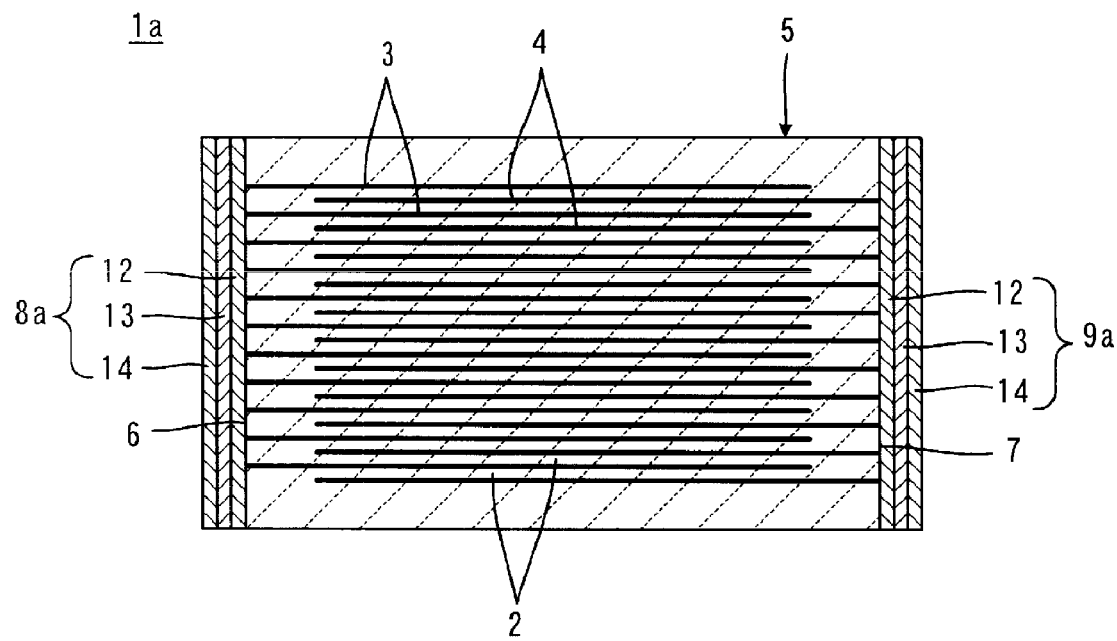
FIG. 3 is a cross-sectional view showing a multilayer electronic device 1a according to a second preferred embodiment of the present invention.

FIG. 3 shows a multilayer electronic device 1a according to a second preferred embodiment of the present invention and corresponds to FIG. 1. In FIG. 3, elements corresponding to the elements shown in FIG. 1 are designated by the same reference numerals, and a description is omitted.

In the external electrodes 8a and 9a of the multilayer electronic device 1a, shown in FIG. 3, the plating films 12 provided on the end surfaces 6 and 7 of the laminate 5 are each used as an underlying layer, and an intermediate plating film 13 defining a second plating film and an exterior plating film 14 are formed by electroplating or electroless.

Since the exterior plating film 14 must have superior wettability to solder, for example, Sn or Au is preferably used as a primary component. In this preferred embodiment, the plating film 12 used as an underlying layer includes, for example, Cu as a primary component. In this case, since the intermediate plating film 13 must prevent solder leaching during solder bonding, for example, Ni is preferably used as a primary component. In addition, when the plating film 12 used as an underlying layer includes Ni as a primary component, the intermediate plating film 13 may be omitted.

According to preferred embodiments of the present invention, since the plating film can be formed in the region at which the conductive particles are adhered, and the conductive particles can be adhered to an optional region on the exterior surface of the laminate, a plating film to be formed into the external electrode can be formed on the optional region on the exterior surface of the laminate. Thus, the external electrode can be formed not only on the end surface of the laminate but also to extend on portions of the side surfaces adjacent to the end surface. Hereinafter, one example of a multilayer electronic device in which each of the external electrodes are formed to extend to portions of side surfaces will be described with reference to FIGS. 4 and 5.

Figure 4:
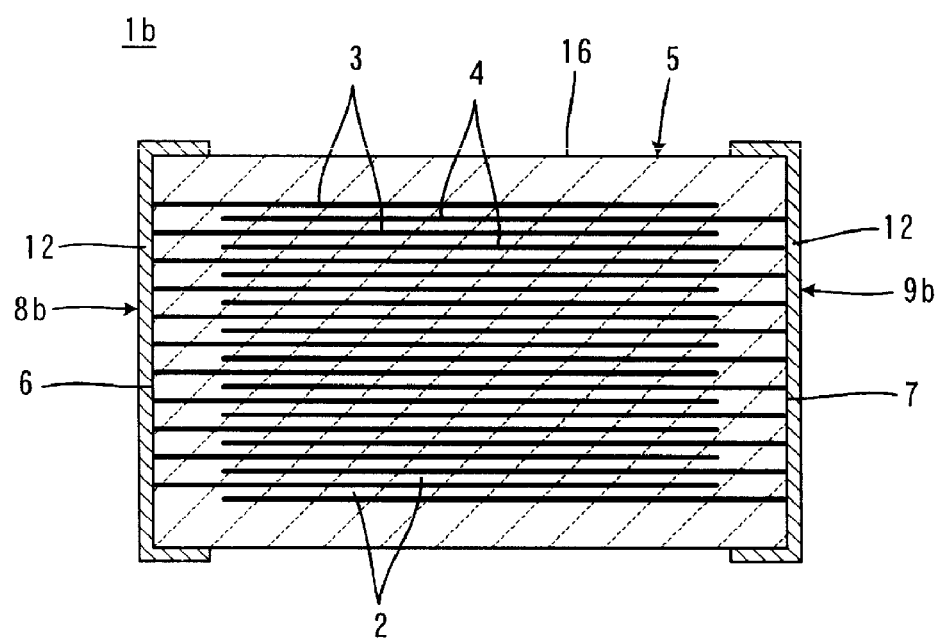
FIG. 4 is a cross-sectional view showing a multilayer electronic device 1b according to a third preferred embodiment of the present invention.
Figure 5:
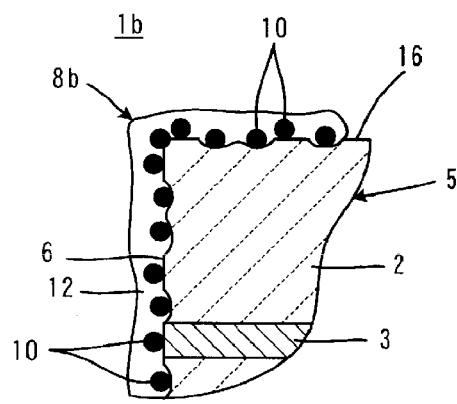
FIG. 5 is a cross-sectional view showing a partially enlarged laminate 5 shown in FIG. 4.
Figure 6:
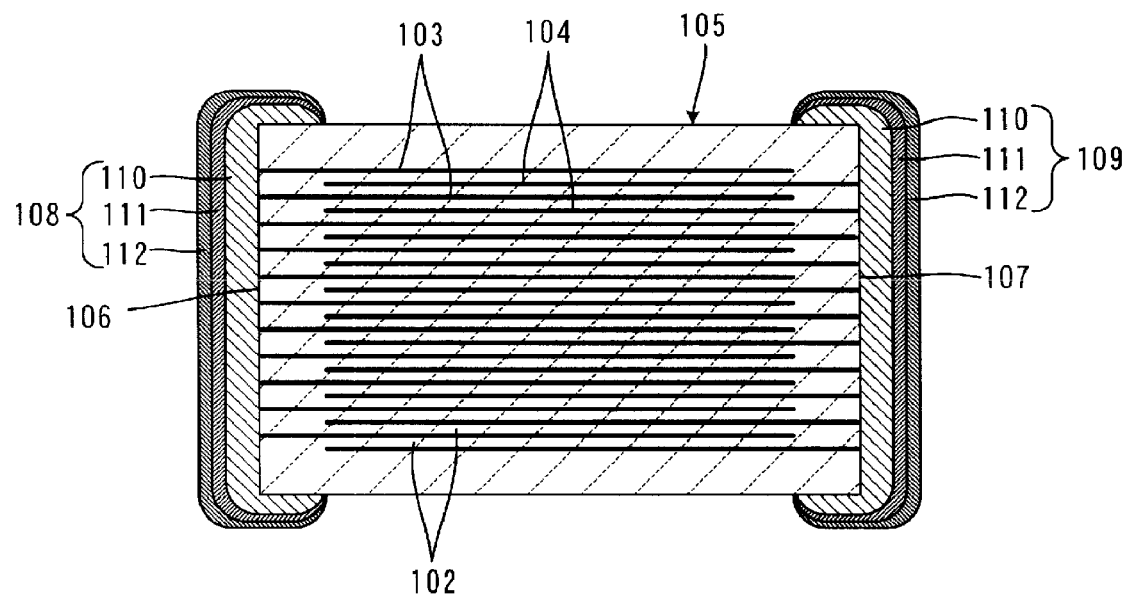
FIG. 6 is a cross-sectional view showing a conventional multilayer electronic device 101.

FIG. 4 is a multilayer electronic device 1b according to a third preferred embodiment of the present invention and corresponds to FIG. 1. FIG. 5 shows a portion of the multilayer electronic device 1b shown in FIG. 4 and is an enlarged view of a ridge portion at which the end surface 6 of the laminate 5 and a side surface 16 adjacent thereto intersect each other. In FIGS. 4 and 5, elements corresponding to the elements shown in FIG. 1 or 2 are designated by the same reference numerals, and a description thereof is omitted.

In the external electrodes 8b and 9b of the multilayer electronic device 1b shown in FIGS. 4 and 5, the plating films 12 defining the external electrodes 8b and 9b are formed not only on the end surfaces 6 and 7 but also to extend on portions of the side surfaces 16 adjacent to the end surfaces 6 and 7. In order to obtain the plating films 12, as shown in FIG. 5, the conductive particles 10 are adhered not only to the end surfaces 6 and 7 of the laminate but also to the portions of the side surfaces 16.

Heretofore, the present invention has been described with reference to the preferred embodiments shown in the figures. However, without departing from the spirit and the scope of the present invention, various changes and modifications may be made.

The multilayer electronic device, to which the present invention has been applied, for example, preferably is a multilayer ceramic capacitor. However, in addition to a multilayer ceramic capacitor, the present invention may also be applied to a multilayer chip inductor, a multilayer chip thermistor, and other suitable multilayer devices.

Accordingly, the insulating layer provided in the multilayer electronic device must have an electrical insulating function. However, the material of the insulating layer is not particularly limited. That is, instead of an insulating layer made of a dielectric ceramic, an insulating layer made of a piezoelectric ceramic, a semiconductor ceramic, a magnetic ceramic, a resin, or other suitable insulating material may also be used.

Hereinafter, the following experimental examples will be described to confirm the effects of various preferred embodiments of the present invention.

Experimental Example 1

In Experimental Example 1, in order to adhere conductive particles, a sandblast method was used.

A laminate for a multilayer ceramic capacitor was prepared having a length of about 1.90 mm, a width of about 1.05 mm, and a height of about 1.05 mm, in which insulating layers were made of a barium titanate dielectric ceramic, and internal electrodes were primarily made of Ni. In this laminate, the thickness of each insulating layer was about 10 μm, the thickness of each internal electrode was about 2 μm, and a top and a bottom exterior layer portion which were not provided with the internal electrodes had a thickness of about 200 μm.

Next, sandblasting was performed on end surfaces of the laminate at which the internal electrodes were exposed. In this sandblasting, polishing particles of alumina having a diameter of about 1 μm were used. As shown in Table 1, for samples 1 to 3, one percent by volume of conductive particles made of a metal shown in "Material for Conductive Particles" having a diameter of about 1 μm was mixed with the polishing particles, and for samples 4 to 6, the conductive particles were not mixed therewith.

Next, electrical conduction imparting rates imparted to the end surfaces of the laminates processed by the sandblasting as described above were obtained. After an element mapping analysis by EDX (energy dispersion x-ray microanalyzer) was performed on the entire end surfaces of the laminate, the electrical conduction imparting rate was obtained from the following equation:

Electrical conduction imparting rate [%]={(area occupied by Ni of internal electrodes+area occupied by conductive particles)/area of entire end surfaces}×100.

In addition, even if the same component as the conductive particle was included in the ceramic components, the concentration of a metal forming the conductive particle was high, such as about 100%, it could be clearly discriminated. The electrical conduction imparting rates thus obtained are shown in Table 1.

Next, the above-described laminate was charged in a horizontal rotating barrel, and iron-made media having a diameter of about 1.8 mm were also charged therein. Subsequently, the rotating barrel was immersed in a Cu plating strike bath having a controlled pH of about 8.5 and a bath temperature of about 25° C., and while the barrel was being rotated at a rotation rate of about 10 rpm, Cu plating films were directly formed on the end surfaces of the laminate at which the internal electrodes were exposed at a current density of about 0.11 A/dm$^2$ for about 20 minutes. In addition, the Cu plating strike bath included about 14 g/L of copper pyrophosphate, about 120g/L of pyrophosphoric acid, and about 10 g/L of potassium oxalate.

Next, a rotating barrel containing the laminate provided with the Cu plating films thereon was immersed in a pyrophosphoric acid bath for Cu plating (Pyrobright process manufactured by C Uyemura & Co., Ltd.), having a controlled pH of about 8.8 and a bath temperature of about 55° C., and while the barrel was being rotated at a rotation rate of about 10 rpm, electroplating was performed at a current density of about 0.30 A/dm$^2$ for a time shown in the column "Plating Time" in Table 1. As described above, on the Cu plating film, a Cu plating film was formed, so that the total thickness of the Cu plating film was obtained as shown in "Plating Film Thickness" shown in Table 1.

Next, with respect to the area of the entire end surfaces of the laminate of each sample, the ratio of the area covered with the plating metal, that is, the plating coverage, was obtained. The plating coverage was obtained as in the case of the above electrical conduction imparting rate, that is, by using an element mapping analysis using EDX, the coverage was obtained from the following equation:

Plating Coverage [%]={area covered with plating metal/area of entire end surfaces}×100

This plating coverage is shown in the column "Coverage" in Table 1.

TABLE 1

| Sample No. | Material for Conductive Particles | Electrical Conduction Imparting Rate (%) | Plating Time (min) | Plating Film Thickness (μm) | Coverage (%) |
|---|---|---|---|---|---|
| 1 | Cu | 27 | 20 | 7 | 100 |
| 2 | Sn | 28 | 20 | 8 | 100 |
| 3 | Au | 30 | 20 | 9 | 100 |
| 4 | — | 10 | 20 | 3 | 20 |
| 5 | — | 10 | 60 | 9 | 60 |
| 6 | — | 10 | 120 | 17 | 85 |

In Table 1, when the samples 1 to 3 and the samples 4 to 6 were compared to each other, first, according to the samples 1 to 3 in which the conductive particles were mixed with the polishing particles in the sandblast step, a high electrical conduction imparting rate was obtained as compared to that of the samples 4 to 6. In addition, according to the samples 1 to 3, a coverage of about 100% was obtained.

On the other hand, according to the samples 4 to 6, the coverage was relatively low. As apparent from the comparison between the samples 4 to 6, as the plating time was increased, although the coverage was improved, it could not reach about 100%. The reason for this is that on the exterior layer portion of the laminate at which the internal electrodes were not formed, the coverage by the plating metal was not promoted. In addition, as apparent from the comparison between the samples 4 to 6, as the plating time was increased, the plating film thickness was increased. However, when the plating film thickness is increased, the miniaturization cannot be achieved, and the cost of manufacturing the multilayer ceramic capacitor is significantly increased.

Experimental Example 2

In Experimental Example 2, in order to adhere conductive particles, a brush polishing method was used.

A laminate for a multilayer ceramic capacitor similar to that of the Experimental Example 1 was prepared.

Brush polishing was performed on end surfaces of the laminate at which internal electrodes were exposed. In this brush polishing, a brush having many resin-made bristles was used. The bristles of this brush included about 30 percent by volume of conductive particles having a particle diameter of about 1 µm with respect to the resin, and, for samples 11 to 13, particles made of metals shown in the column "Material for Conductive Particles" were used. In addition, in Table 2, for comparison purpose, the samples 2 and 3 formed in the above Experiment Example 1 are also shown.

Next, by a method similar to that of the Experimental Example 1, the electrical conduction imparting rates imparted to the end surfaces of the laminates of the individual samples were obtained. The results are shown in the column "Electrical Conduction Imparting Rate" in Table 2.

Next, by a method similar to that of the Experimental Example 1, Cu plating films were formed on the end surfaces of the laminates of the individual samples. In this step, the Cu plating at the second stage was performed for about 20 minutes as shown in the column "Plating Time" in Table 2. In addition, the total thickness of the Cu plating film was as shown in "Plating Film Thickness" in Table 2.

Next, by a method similar to that of the Experimental Example 1, covering area rates of the plating metal of the entire side surfaces of the laminates of the individual samples were obtained. The results are shown in the column "Coverage" in Table 2.

Furthermore, the bonding strength of the plating film of each sample was evaluated. For the evaluation of the bonding strength, the laminate provided with the plating films thereon was mounted on a glass-epoxy substrate by eutectic solder, and a standard push-pull type bonding strength tester was used. In addition, the evaluation of the bonding strength was also performed for the samples 2 and 3 formed in the Experimental Example 1. The results are shown in the column "Bonding Strength" in Table 2.

As shown in Table 2, with the brush polishing, as with the sandblasting in the Experimental Example 1, a coverage of about 100% was achieved.

In addition, the bonding strength obtained by the brush polishing was superior to that obtained by the sandblast.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for manufacturing a multilayer electronic device, comprising the steps of:
   preparing a laminate including a plurality of insulating layers laminated to each other and a plurality of internal electrodes formed along interfaces between the insulating layers, edges of the internal electrodes being exposed at a predetermined surface of the laminate; and
   forming an external electrode on the predetermined surface so as to electrically connect the edges of the internal electrodes which are exposed at the predetermined surface of the laminate; wherein
   the step of forming an external electrode includes the steps of:
   adhering conductive particles having a particle diameter of about 1 µm or more to the predetermined surface of the laminate which is prepared in the step of preparing a laminate; and
   performing plating directly on the predetermined surface to which the conductive particles are adhered.

2. The method for manufacturing a multilayer electronic device, according to claim 1, wherein the step of adhering conductive particles includes a step of performing a sandblast method on the predetermined surface using the conductive particles mixed with polishing particles having a polishing effect.

3. The method for manufacturing a multilayer electronic device, according to claim 1, wherein the step of adhering conductive particles includes a step of performing a brush polishing method on the predetermined surface using a brush having resin-made bristles which include the conductive particles.

4. The method for manufacturing a multilayer electronic device, according to claim 1, further comprising the steps of:
   before the step of performing plating, adhering glass particles to the predetermined surface of the laminate; and
   after the step of performing plating, performing a heat treatment so as to diffuse glass in the glass particles.

TABLE 2

| Sample No. | Material for Conductive Particles | Electrical Conduction Imparting Rate (%) | Plating Time (min) | Plating Film Thickness (µm) | Coverage (%) | Bonding Strength (MPa) |
|---|---|---|---|---|---|---|
| 11 | Cu | 31 | 20 | 9 | 100 | 51 |
| 12 | Sn | 30 | 20 | 8 | 100 | 46 |
| 13 | Au | 30 | 20 | 9 | 100 | 48 |
| 2 | Sn | 28 | 20 | 8 | 100 | 28 |
| 3 | Au | 30 | 20 | 9 | 100 | 21 |

5. A multilayer electronic device comprising:

a laminate including a plurality of insulating layers laminated to each other and a plurality of internal electrodes arranged along interfaces between the insulating layers, edges of the internal electrodes being exposed at a predetermined surface of the laminate; and an external electrode provided on the predetermined surface of the laminate; wherein the external electrode includes a plated film which is directly provided on the predetermined surface of the laminate so as to electrically connect the edges of the internal electrodes, which are exposed at the predetermined surface of the laminate; and at a boundary portion between the predetermined surface and the plating film, a plurality of conductive particles having a particle diameter of about 1 μm or more is provided.

* * * * *